United States Patent
Vahidsafa et al.

(10) Patent No.: US 9,218,018 B2
(45) Date of Patent: Dec. 22, 2015

(54) METHOD AND APPARATUS FOR DISTRIBUTED GENERATION OF MULTIPLE CONFIGURABLE RATIOED CLOCK DOMAINS WITHIN A HIGH SPEED DOMAIN

(75) Inventors: Ali Vahidsafa, Palo Alto, CA (US); Robert Paul Masleid, Monte Sereno, CA (US)

(73) Assignee: Oracle International Corporation, Redwood City, CA (US)

( * ) Notice: Subject to any disclaimer, the term of this patent is extended or adjusted under 35 U.S.C. 154(b) by 672 days.

(21) Appl. No.: 13/619,733

(22) Filed: Sep. 14, 2012

(65) Prior Publication Data

US 2014/0082396 A1     Mar. 20, 2014

(51) Int. Cl.
- G06F 1/12 (2006.01)
- G06F 1/06 (2006.01)
- G06F 1/10 (2006.01)

(52) U.S. Cl.
CPC .. G06F 1/12 (2013.01); G06F 1/06 (2013.01); G06F 1/10 (2013.01)

(58) Field of Classification Search
None
See application file for complete search history.

(56) References Cited

U.S. PATENT DOCUMENTS

| | | | | |
|---|---|---|---|---|
| 5,684,956 A | * | 11/1997 | Billings | 709/219 |
| 5,758,132 A | * | 5/1998 | Strahlin | 713/501 |
| 2007/0176653 A1 | * | 8/2007 | Huott et al. | 327/115 |
| 2010/0325469 A1 | * | 12/2010 | Yokoyama et al. | 713/600 |

* cited by examiner

*Primary Examiner* — Kim Huynh
*Assistant Examiner* — Paul J Yen
(74) *Attorney, Agent, or Firm* — Polsinelli PC (57) ABSTRACT

Implementations of the present disclosure involve an apparatus and/or method for providing one or more clock signals within a processing device. In particular, one or more counter devices may be integrated into a microprocessor design that operates on a system clock signal to provide ratioed synchronous clock signals for use by the microprocessor. Additionally, one or more synchronization pulse signals are also generated from the one or more counter devices to facilitate communication between domains of the microprocessor that may operate on separate clock frequencies. Such synchronization pulse signals may also provide for a virtual clock signal within a clock domain to create a low frequency logic cluster within a high frequency domain of the microprocessor. A synchronous, low frequency reset signal is also disclosed to synchronize the counting devices to the system clock without the need for an additional high frequency signal path in the microprocessor design.

12 Claims, 7 Drawing Sheets

METHOD AND APPARATUS FOR DISTRIBUTED GENERATION OF MULTIPLE CONFIGURABLE RATIOED CLOCK DOMAINS WITHIN A HIGH SPEED DOMAIN

FIELD OF THE DISCLOSURE

Aspects of the present invention relate to computing systems and, more particularly, aspects of the present invention involve an apparatus and method for implementing one or more distributed high frequency clock signals in a computing environment, such as a microprocessor device, without the said distributed implementation requiring any shared high speed signals other than a shared clock.

BACKGROUND

Computers are ubiquitous in today's society. They come in all different varieties and can be found in places such as automobiles, laptops or home personal computers, banks, personal digital assistants, cell phones, as well as many businesses. In addition, as computers become more commonplace and software becomes more complex, there is a need for the computing devices to perform at faster and faster speeds in smaller and smaller packages. For example, newer microprocessors often have higher operating frequencies than previous generations of microprocessors, which often results in an increase in processing power for the processor.

Microprocessors that operate at a high frequency typically have some high frequency clock generator circuitry that generates a high frequency clock signal that is used to pace the operation of the microprocessor. This high frequency clock signal is then transmitted throughout the microprocessor chip on high frequency wires or lines on the chip. This collection of high frequency signal paths in the microprocessor design is known as the fan out of the clock signal. However, such high frequency paths in the chip are often costly, both in terms of utilized chip area, hardware costs and power consumed, as well as being more complicated to design. Such costs have typically been accepted during the design of microprocessors, though, as synchronization between the various components of the microprocessor is crucial to the proper operation of the device.

Thus, techniques are described herein to reduce the number and length of high frequency signal paths in a microprocessor design to provide a cost and power savings over previous microprocessor designs while maintaining synchronization between the various components of the microprocessor.

It is with these and other issues in mind that various aspects of the present disclosure were developed.

SUMMARY

One implementation of the present disclosure may take the form of a microprocessor comprising a processor clock generating circuit configured to generate a processor clock signal and a plurality of logic domains. Each of the plurality of logic domains comprises a header portion comprising at least one counter configured to generate an output value signal that increments or decrements on each cycle of the processor clock signal. Further, each header portion is configured to generate a plurality of clock signals from the output signal of the at least one counter of each header portion, the plurality of clock signals being synchronized and ratioed to the processor clock signal and configured to generate one or more synchronization pulse signals configured to enable communication between portions of the microprocessor, the synchronization pulse signals being synchronized to the processor clock signal.

Another implementation of the present disclosure may take the form of method for generating a plurality of synchronized clock signals in a microprocessor. The method may include the operation of suspending a processor clock signal configured to pace the operation of a plurality of counters associated with the microprocessor, wherein each of the plurality of counters is configured to generate an output value signal that increments or decrements on each cycle of the processor clock signal. The method also includes the operations of asserting a reset signal while the processor clock signal is suspended, transmitting the asserted reset signal to the plurality of counters, the plurality of counters configured to reset the output value signal of each of the plurality of counters to a beginning value when receiving an asserted reset signal and then restarting the processor clock signal. In addition, the method may generate a plurality of clock signals from the output signal of the plurality of counters, wherein the plurality of clock signals are synchronized and ratioed to the processor clock signal.

In yet another implementation of the present disclosure may take the form of computer system comprising an input unit and a multi-core processor coupled to the input unit. The processor includes a processor clock generating circuit configured to generate a processor clock signal, a plurality of logic domains and a plurality of interface circuits each associated with at least one of the plurality of logic domains, wherein each interface circuit comprises at least one counter configured to generate an output value signal that increments or decrements on each cycle of the processor clock signal. In addition, each interface circuit of the processor is configured to generate a plurality of clock signals from the output signal of the at least one counter of each interface circuit, the plurality of clock signals being synchronized and ratioed to the processor clock signal and is further configured to generate one or more synchronization pulse signals configured to enable communication between the plurality of logic domains of the processor, the synchronization pulse signals being synchronized to the processor clock signal.

DETAILED DESCRIPTION

Implementations of the present disclosure involve an apparatus and/or method for providing one or more distributed clock signals within a processing device. In particular, the present disclosure provides for one or more counter devices integrated into a microprocessor design that operate on a processor clock signal to provide ratioed synchronous clock signals for use by the microprocessor. The counter devices may be associated in a distributed configuration throughout the microprocessor design with one or more domain headers. In this manner, the microprocessor may include a high frequency path for just a processor clock signal to the domain headers and generate other high frequency clock signals at the domains of the processor, saving critical chip space and resources for other aspects of the design as the number and length of high frequency signal paths in the design are reduced.

Additionally, one or more synchronization pulse signals are also generated from the one or more counter devices to facilitate communication between domains of the microprocessor that may operate on separate clock frequencies. Such synchronization pulse signals may also provide for a virtual clock signal within a clock domain to create a low frequency logic cluster within a high frequency domain of the microprocessor. In one embodiment, the counter devices are integrated into headers of the domains of the microprocessor to reduce the need for high frequency signal paths in the microprocessor design to carry the ratioed synchronous clock signals throughout the design. An apparatus and/or method for a synchronous, low frequency reset signal is also disclosed to synchronize the counting devices to each other without the need for an additional high frequency signal path in the microprocessor design.

Figure 1:
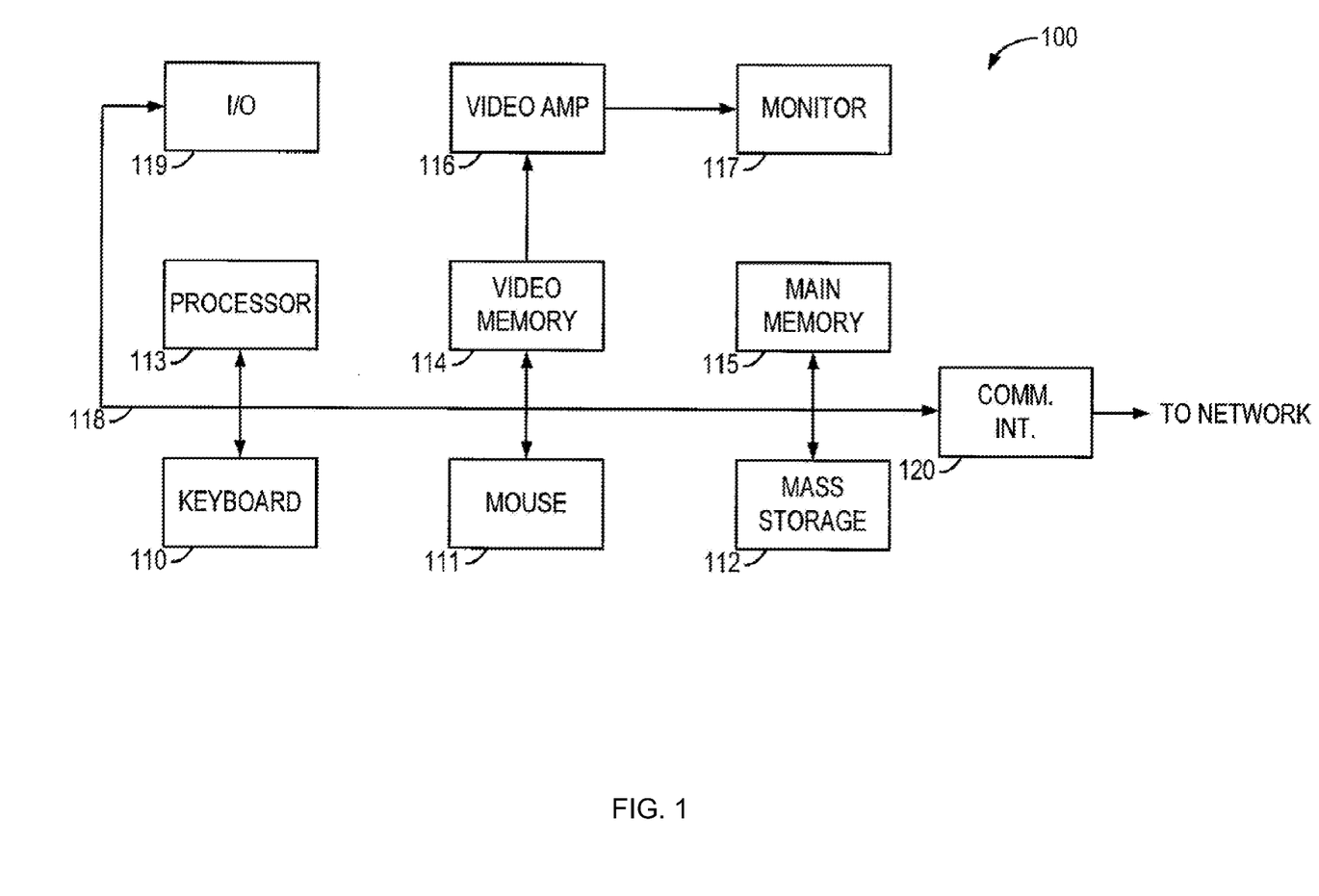
FIG. 1 is a block diagram illustrating an example of a computing system which may be used in implementing embodiments of the present disclosure.

FIG. 1 illustrates an exemplary computer system 100 capable of implementing the methods and operations described in this disclosure. In some embodiments, the computer system 100 may be an implementation of enterprise level computers, such as one or more blade-type servers within an enterprise. In other embodiments, the computer system 100 may be a personal computer and/or a handheld electronic device. A keyboard 110 and mouse 111 may be coupled to the computer system 100 via a system bus 118. The keyboard 110 and the mouse 111, in one example, may introduce user input to the computer system 100 and communicate that user input to a processor 113. Other suitable input devices may be used in addition to, or in place of, the mouse 111 and the keyboard 110. An input/output unit 119 (I/O) coupled to system bus 118 represents such I/O elements as a printer, audio/video (NV) I/O, etc.

Computer 100 also may include a video memory 114, a main memory 115 and a mass storage 112, all coupled to the system bus 118 along with the keyboard 110, the mouse 111 and the processor 113. The mass storage 112 may include both fixed and removable media, such as magnetic, optical or magnetic optical storage systems and any other available mass storage technology. The bus 118 may contain, for example, address lines for addressing the video memory 114 or the main memory 115. In some embodiments, the main memory 115 is a fully buffered dual inline memory module (FB-DIMM) that communicates serially with other system components.

The system bus 118 also may include a data bus for transferring data between and among the components, such as the processor 113, the main memory 115, the video memory 114 and the mass storage 112. The video memory 114 may be a dual-ported video random access memory. One port of the video memory 114, in one example, is coupled to a video amplifier 116, which is used to drive a monitor 117. The monitor 117 may be any type of monitor suitable for displaying graphic images, such as a cathode ray tube monitor (CRT), flat panel, or liquid crystal display (LCD) monitor or any other suitable data presentation device.

In some embodiments, the processor 113 is a SPARC® microprocessor from Oracle Corp. although any other suitable microprocessor or microcomputer may be utilized. The processor 113 and its communication protocols in relation to clock signal propagation employed by the processor are described in more detail below with regard to FIGS. 2-7.

The computer system 100 also may include a communication interface 120 coupled to the bus 118. The communication interface 120 provides a two-way data communication coupling via a network link. For example, the communication interface 120 may be a local area network (LAN) card, or a cable modem, and/or wireless interface. In any such implementation, the communication interface 120 sends and receives electrical, electromagnetic or optical signals which carry digital data streams representing various types of information.

Code received by the computer system 100 may be executed by the processor 113 as it is received, and/or stored in the mass storage 112, or other non-volatile storage for later execution. In this manner, the computer system 100 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Figure 2:
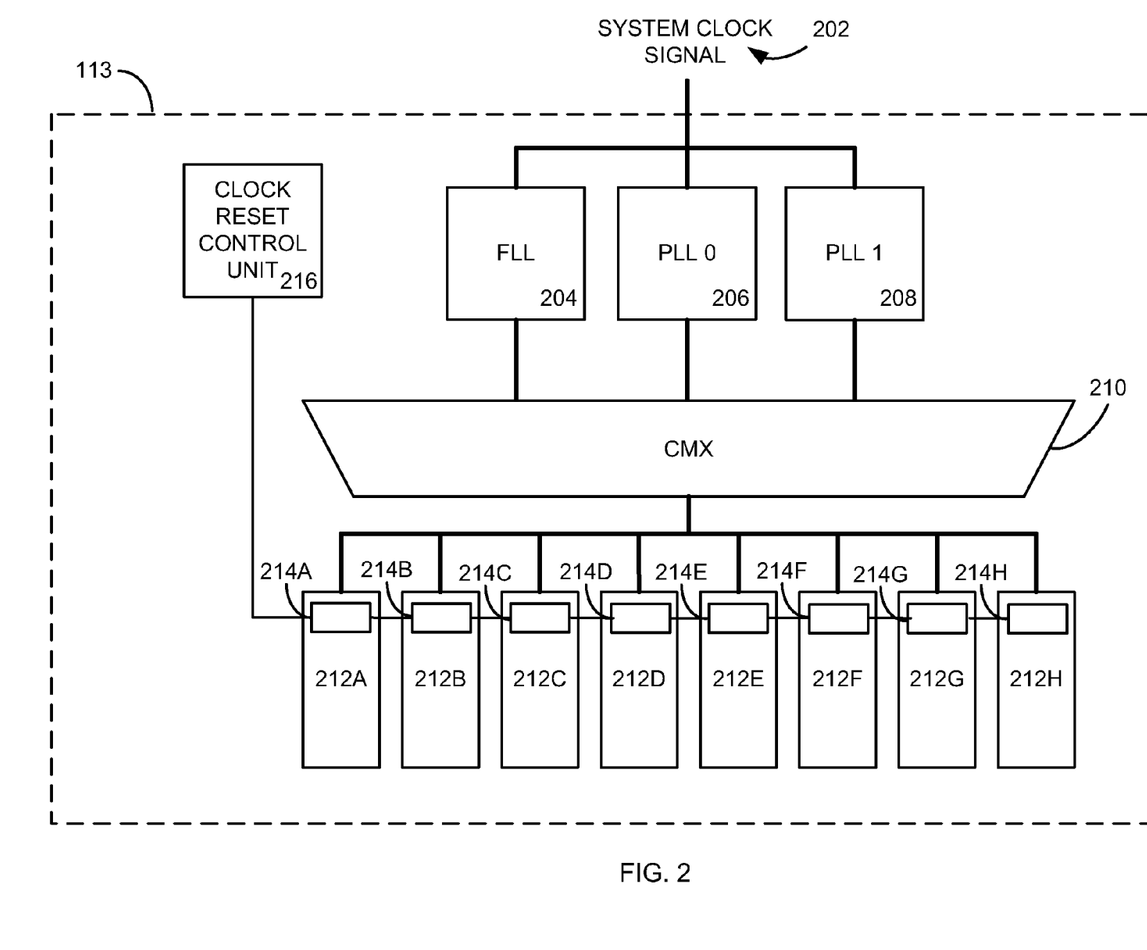
FIG. 2 is a circuit diagram illustrating the distribution of a system clock signal in a microprocessor with multiple domains.

FIG. 2 illustrates an exemplary implementation of some portions of the processor 113 of the system of FIG. 1 that may be capable of implementing one or more of the microprocessor designs and methods described below. In general, the designs and operations described herein may be utilized by any type of computing system that utilizes a system clock signal to pace the operation of the system. However, for simplicity, the embodiments of the present disclosure are discussed herein with reference to a microprocessor that includes domains and/or portions of logic of a microprocessor that operate on different clock frequencies. The microprocessor 113 of FIG. 2 may be associated with a larger computer system, such as that described in FIG. 1. Also for simplicity, several aspects of the microprocessor 113 design are not illustrated in FIG. 2 to highlight the portions of the design related to the present disclosure.

A timing or clock signal 202 for the processor 113 may be provided by a computing system, such as the computer system of FIG. 1. In the particular embodiment shown, a common clock signal 202 is utilized by the computing system 100 to run the components of the system. In an alternate embodiment, however, the processor 113 may generate a reference clock signal for use within the processor and/or other components of the computing system. Regardless of which embodiment is used, the actual clock generation circuitry may take a variety of physical forms, including in some embodiments, a crystal based oscillator with relatively low phase noise and/or clock jitter. In other embodiments, the clock generation circuitry may be a frequency synthesized signal based on a crystal oscillator signal, such as a phase locked loop (PLL) synthesizer, a delay-locked-loop (DLL) synthesizer or a frequency locked loop (FLL) synthesizer.

In the embodiment shown in FIG. 2, the system clock signal 202 is transmitted to one or more processor clock generators 204-208 to generate one or more clock signals for the processor 113. The processor clock generators 204-208 for the processor 113 may take any of the variety of the physical forms described above. In the particular embodiment shown, the system clock signal 202 drives an FLL clock generator 204, a first PLL clock generator 206 and a second PLL clock generator 208. Although three clock generators are illustrated in FIG. 2, any number of clock generators may be incorporated into the processor 113. As should be appreciated, the clock generators 204-208 of the processor 113 provide one or more clock signals for the processing device.

The outputs of the clock generators 204-208 are transmitted to a clock multiplexer 210, shown as "CMX" in FIG. 2. In addition to the receiving the clock signals, the clock multiplexer ("CMX") also receives a select signal to select which clock signal of the clock generators 204-208 is transmitted through the CMX to portions of the processor 113. The select signal is controlled by hardware logic, a software program, or a combination of hardware and software controlled by the processor 113. Also, as explained in more detail below, the CMX 210 may be further configured to receive an input on the select signal input that causes the CMX to provide no output. Thus, in this circumstance, the CMX 210 provides no clock signal at the output of the CMX.

As also shown in FIG. 2, the processor 113 may include a plurality of processor domains or clusters 212A-H that receive the clock signal from the CMX 210. In one embodiment, the domains 212A-H are separate cores of the processor. In general, however, the processor domains 212A-H of FIG. 2 may represent any portion of the microprocessor 113 that includes at least one logic device and receives a clock signal to pace the operation of the at least one logic device. For purposes of this disclosure, the domains 212A-H of the processor 113 may be referred to as domains, clusters or cores.

In the embodiment where the domains 212A-H are cores of a processor, the cores 212A-H may be configured to execute instructions and to process data according to a particular instruction set architecture (ISA). As shown in FIG. 2, each of the cores 212A-H may be configured to operate independently of the others, such that all the cores 212A-H may execute code in parallel. Additionally, in some embodiments each of the cores 212A-H may be configured to execute multiple threads concurrently, where a given thread may include a set of instructions that may execute independent of instructions from another thread. For example, an individual software process executing on the computer system 100, such as an application, may consist of one or more threads that may be scheduled for execution by an operating system. In some implementations, each of the cores 212A-H may be configured to concurrently execute instructions from eight threads, for a total of 64 threads concurrently executing across the processor 113.

Regardless of the physical form of the circuitry of the domains 212A-H, each domain may include one or more interface circuits or headers 214A-H. In general, a domain header 214A-H is a logic circuit associated with a domain configured to receive a clock signal from a global clock source and generate one or more clock signals for the associated domain based on the received global clock signal. Thus, the domain header 214A-H for each domain 212A-H receives the clock signal from the CMX 210, referred to herein as the processor clock signal. As explained in more detail below, the domain headers 214A-H utilize the processor clock signal to generate one or more synchronized clock signals for the domain to which the domain header is associated. Through the systems and methods described herein, the clock signals generated by the headers 214A-H are synchronized to the processor clock signal so that communication between the domains 212A-H may occur.

The microprocessor 113 also includes a clock reset control unit 216. The clock reset control unit 216 includes some logic devices to create and transmit a reset signal to the headers 214A-H of the domains 212A-H. As explained in more detail below, the clock reset signal is utilized by the microprocessor to synchronize one or more clock signals generated within one or more headers 214A-H of the domains 212A-H. In one embodiment, the clock reset signal is transmitted at the same frequency as the processor clock signal to ensure that the clock signals of the microprocessor synchronize accurately. In another embodiment, the clock reset signal is a low frequency signal that may be transmitted on low frequency paths in the microprocessor design. In one embodiment, the clock reset control unit 216 is integrated into the clock generator circuitry of the processor.

Figure 3:
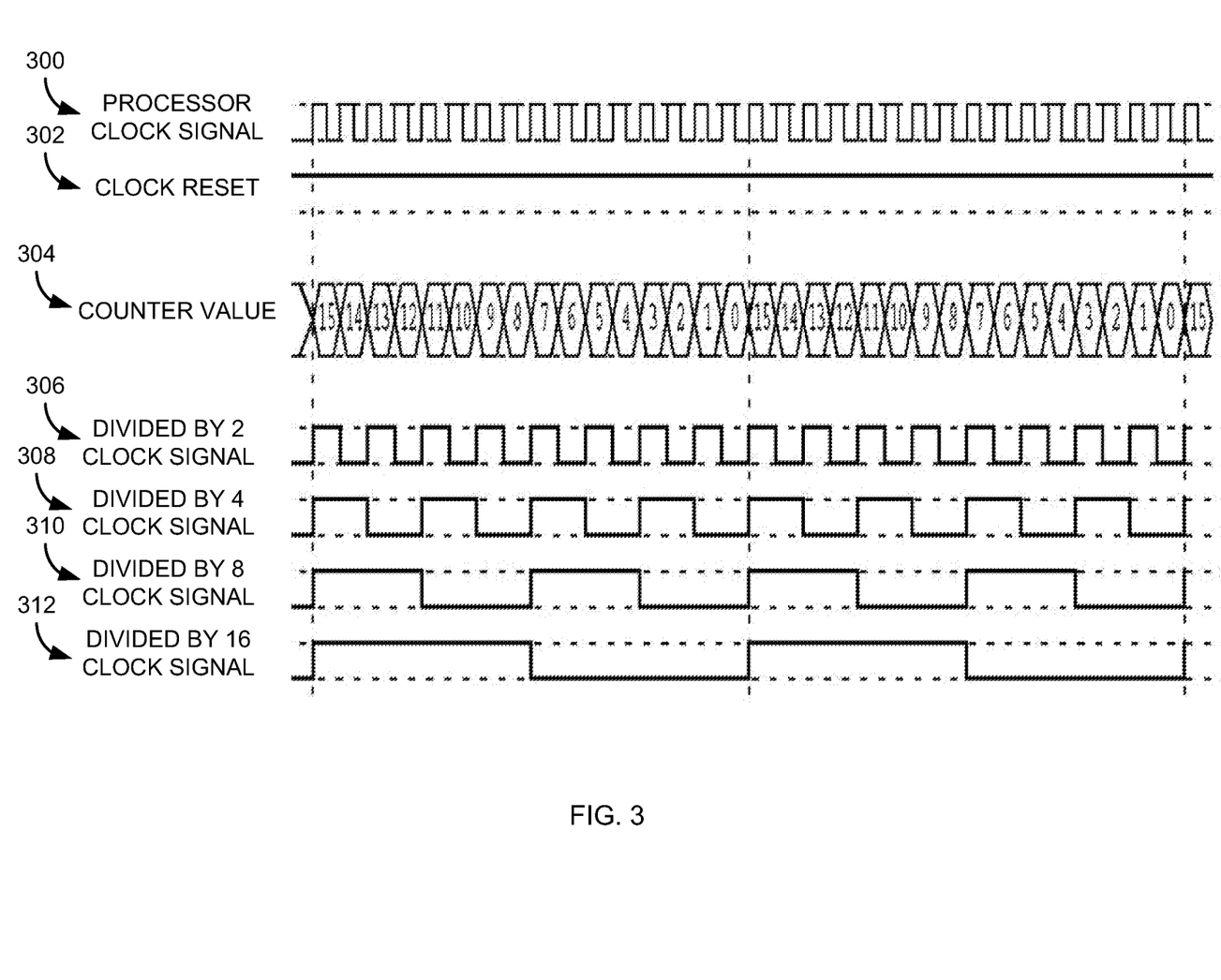
FIG. 3 is a timing diagram illustrating utilizing a counter to create a plurality of synchronous clock signals that are synchronized ratioed signals of the system clock signal.

As mentioned above, it is often advantageous to operate portions of a microprocessor at a lower frequency than the processor clock signal. For example, operating a core of the processor at a lower frequency than the global processor clock results in power savings for the processor. Also, lower frequency clock signals require less expensive hardware and less chip die area to transmit the signal. FIG. 3 is a timing diagram illustrating several lower frequency clock signals based on the processor clock signal. In one embodiment, the lower frequency clock signals may be created utilizing one or more counter devices whose outputs create synchronous clock signals that are a ratioed signal to a processor clock signal.

In particular, the timing diagram of FIG. 3 shows a processor clock signal 300. In one example, the processor clock signal 300 may be the selected clock signal provided at the output of the CMX of FIG. 2. In general, however, the processor clock signal 300 may be any clock signal utilized by the processor to pace one or more logic devices of the processor. In addition, a clock reset signal 302 is shown. The clock reset signal 302 is a reset signal transmitted to one or more counters of the processor design to reset the counter signal 304. In the example shown, the clock reset signal is not activated in the time frame illustrated in FIG. 3 such that the counters are not being reset during the time period shown. The clock reset signal 302 is discussed in more detail below with reference to FIGS. 6A-7.

Also illustrated in FIG. 3 is the output value 304 of an exemplary counter. In general, the counter illustrated is a counting logic device configured to repeatedly provide an output value the decrements from a value of fifteen to zero. In one example, the output of the counter is a four digit binary number that repeatedly decrements from a value of fifteen (represented by the output "1111") to zero (represented by the output of "0000") on each pulse of a supplied clock signal. In the example shown, the counter operates on the processor clock signal 300 such that each decrement of the output value 304 of the counter occurs on each rising edge of the processor clock signal. Also, the decrementing pattern 304 continuously repeats to provide a steady output pattern. Those of skill in the art are aware of the multiple designs for counting logic devices that operate as described such that counting logic designs are not discussed herein for simplicity.

In the embodiment shown, the counter value signal 304 operating on the processor system clock 300 is utilized to create a variety of synchronized, lower frequency, ratioed clock signals. For example, the digits of the output value 304 of the counter are used as the synchronized clock signals. In particular, the toggling of the lowest bit of the output value 304 of the counter creates the divided by two clock signal 306, the toggling of the second lowest bit creates the divided by four clock signal 308, the toggling of the third bit of the output value of the counter creates the divided by eight clock signal 310 and the toggling of the highest bit creates the divided by sixteen clock signal 312. In addition, because the counter value signal 304 operates on the processor clock signal 300, the created clock signals are a synchronized, ratioed signal of the processor clock signal 300. Thus, the frequency of the divided by two clock signal 306 is one-half of the processor clock signal 300, the frequency of the divided by four clock signal 308 is one-fourth of the processor clock signal, and so on. By utilizing the bits of the counter value, several ratioed synchronous clock signals may be created from the processor clock signal 300. These slower clock signals may then be utilized by the processor to drive portions of the processor design that may not require the faster processor clock signal 300, thereby providing power and cost savings for the processor design.

Other methods exist for deriving a repeating signal synchronized to a global clock signal from a counter operating on the global clock signal. For example, logic hardware devices may be configured to receive the output of the counter and generate a synchronized signal, rather than merely utilizing the bits of the counter output. In a particular example, a divided by sixteen signal may be generated by a combination of logic devices that asserts an output for the clock cycles where the counter output equals any value from fifteen to eight. Similarly, the logic devices are configured to provide a de-asserted output for the clock cycles where the counter output equals any value from seven to zero. In another embodiment, a software program may be utilized by the processor to analyze the output of the counter and generate a ratioed, synchronized clock signal. In yet another embodiment, the synchronized clock generator may include a combination of logic devices and software programs to generate the synchronized clock signals. Regardless of the embodiment utilized, the processor may create any type of clock signal utilizing the counter output that is synchronized and ratioed to the global clock signal of the processor.

In one embodiment, the synchronized ratioed clock signals may be generated in a central location within the processor design and provided to each of the domains of the processor to operate the slower portions of the design. In other words, the processor may include a high frequency clock signal tree that provides the processor clock signal to the portions of the processor and one or more lower frequency clock signal trees that provide the one or more synchronized ratioed clock signals to the portions. However, such a design may consume vast amounts of chip space that may be utilized for other processor resources. Thus, in one embodiment, one or more counters may be associated with the domain headers 214A-H that provides the output from which the ratioed synchronized signals are obtained. Thus, rather than utilizing a centralized location to generate the clock signals, each header of the processor may generate the synchronized clock signals for that domain. In this manner, space on the processor chip is conserved by removing the lower clock frequency trees from the centralized location. This increase in chip space may then be utilized for other processor resources.

Although utilizing clock signals of varying frequency within a processor provides power and cost savings for the processor, communication between portions of the processor may become problematic when the portions are operating on different clock signals. For example, domain A 212A of the processor 113 may be operating on the processor clock signal 300 while domain B 212B operates on the divided by four clock signal 308. To ensure that information transmitted from domain A 212A to domain B 212B is received by domain B, the processor 113 accounts for the slower clock signal of domain B to ensure that the transmitted information is synchronously received at domain B. In one embodiment of the processor 113, synchronous pulse signals, or synch pulses, are utilized to ensure synchronous communication between portions of the processor operating on different clock signals.

In general and similar to the synchronized ratioed clock signals, sync pulses are generated by the domain header logic to provide synchronization between domains operating on a ratioed clock. The sync pulses control the transmission of information from one domain to another such that the communication appears as a synchronous single clock cycle to the slower domain clock signal. Thus, the domain header may generate one or more synch pulse signals to account for the various ratioed clock signals utilized within the processor. In particular, the domain header utilizes the counter output value 304 similar to that shown in FIG. 3 to create the one or more synch pulse signals. For example, logic devices within the header may be configured to create the synch pulse, such as providing an asserted signal when the counter output value is zero and a de-asserted signal when the counter output is any other value. In general, any type of recurring signal that is synchronized to the processor clock signal may be generated by the output of the counter through one or more logic components by asserting or de-asserting the synch pulse signal based on the counter output value. Similar to the synchronized ratioed clock signals described above, the synch pulse signals may be configured through hardware devices, software programs and/or a combination of hardware and software components. One example of the operation of a sync pulse to synchronize communication between domains operating on ratioed clock signals is illustrated in FIGS. 4A and 4B below.

Figure 4A:
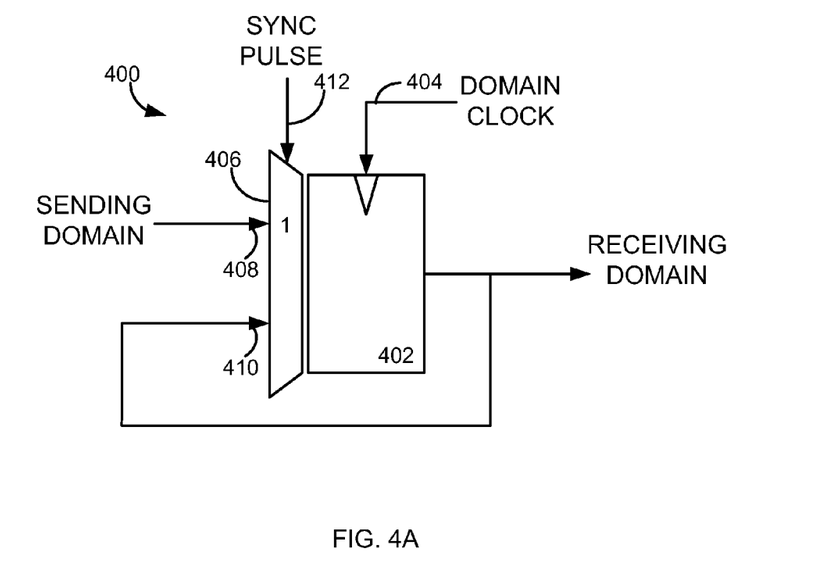
FIG. 4A is a circuit diagram illustrating utilizing a synch pulse to create an interface between domains of a microprocessor operating on separate clock signals.

FIG. 4A is a circuit diagram illustrating utilizing a synch pulse signal to facilitate communication between domains of a microprocessor operating on separate clock signals. In particular, the circuit 400 includes a flip-flop electronic circuit device 402 or other latch-type electronic device paced by the domain clock signal 404. In operation, domain clock signal 404 is provided to the flip-flop 402 such that at each rising edge of the domain clock signal, the flip-flop device latches the value at the input of the flip-flop, and provides that value to the output of the flip-flop. Also included is a multiplexer device 406 electrically connected to the input of the flop latch 402. The multiplexer 406 is configured to select between two inputs based on the value at selector input 412. As shown in FIG. 4A, one input to the multiplexer 406 includes information 408 being transmitted from a sending domain. The second input 410 to the multiplexer 406 is electrically connected to the output of the flop 402 through a feedback loop from the output of the flop to the second input of the multiplexer.

In operation, the latch continually inputs and stores the value at the second input 410 while the synch pulse signal 412 is inactive, or "low". In other words, at each rising edge of the domain clock signal 404, the output of the latch 402 is fed back to the second input 410 and latched accordingly. However, when the synch pulse signal 412 goes active, or "high", the multiplexer 406 selects the information 408 from the sending domain, which is then latched in the latch device 402. The information is then transmitted to the receiving domain connected to the output of the latch device. In this manner, the synch pulse signal 412 controls the latching of the information 408 such that the information is transmitted to the receiving domain at the frequency of the synch pulse. Further, the information appears to the receiving domain to be aligned with the synch pulse. In one embodiment, the synch pulse signal 412 is constructed at a similar frequency as the clock signal of the slower domain such that the transmission of the information appears synchronous to the clock signal of the slower domain of the communication. An example of the operation of circuit 400 of FIG. 4A can be seen in more detail in the timing diagram of FIG. 4B, discussed below.

Figure 4B:
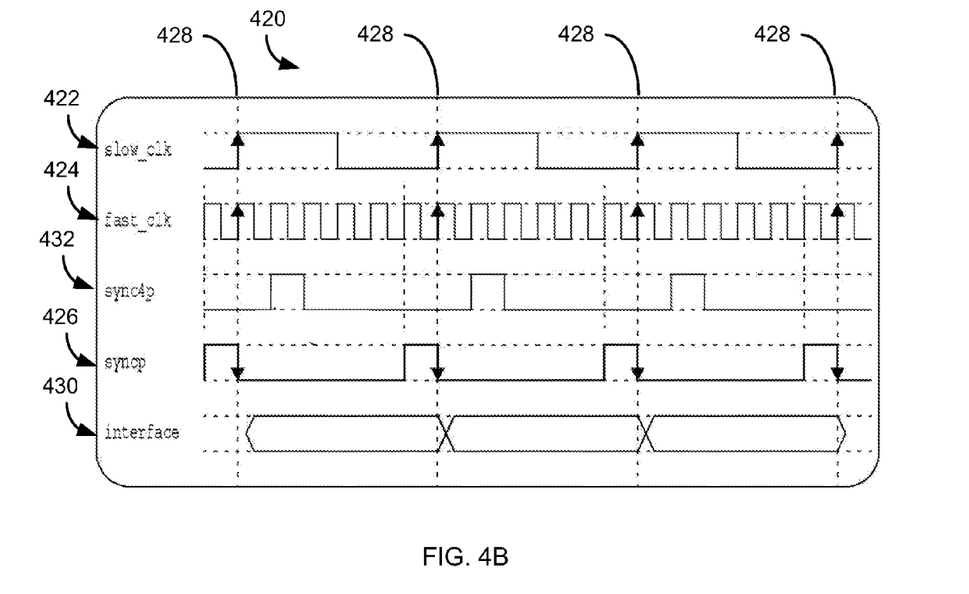
FIG. 4B is a timing diagram illustrating the operation of the circuit diagram of FIG. 4A utilizing a synch pulse to communicate between domains of a microprocessor.

FIG. 4B is a timing diagram 420 illustrating the operation of the circuit diagram of FIG. 4A utilizing a synch pulse to facilitate communication between domains of a microprocessor. In particular, the timing diagram 420 includes a clock signal for a slow clock domain 422 and a clock signal for a fast clock domain 424. In this example, the frequency of the slow clock signal 422 is one-sixth the frequency of the fast clock signal 424, although the slow clock signal may be any derivative of the fast clock signal. In relation to the circuit of FIG. 2, one domain of the processor 113 is operating on the slow clock signal 422 while another domain is operating on the fast clock signal 424 such that communication between the domains may use a synch pulse signal 426 and the circuit 400 of FIG. 4A.

To facilitate the transmission of the information between the domains, the synch pulse signal 426 is generated to de-assert on a coincident edge of the two clock signals. A coincident edge of the clock signals 428 occurs when the two clock cycles have a rising edge at the same time. Thus, as shown by the dotted lines 428 in the timing diagram 400 that indicate the occurrence of the coincident edges of the two clock signals, both signals have a rising edge that occurs at the same time. At these points in the graph, information may be transmitted between the domains. As such, the synch pulse signal 426 is configured to be asserted for one full clock cycle of the fast clock signal 424 before the coincident edge 428 such that the information is transmitted from one domain to the other at the coincident edge through the circuit 400 of FIG. 4A. This is shown by the interface signal 430 of the timing diagram 400 that changes at each coincident edge of the two clock signals. In other words, the information transmitted from one domain to the other, such as the interface signal 430, appears to be synchronized to the slow clock signal 422, which is the clock signal of the slow clock domain.

In relation to the circuit 400 of FIG. 4A, the information 408 from the sending domain is latched and maintained in the latch device 402 through the feedback loop while the sync pulse signal 426 is de-asserted. Upon assertion of the synch pulse signal 426, the information 408 at the first input to the multiplexer 406 is latched into the latch device 402 at the following positive edge of the domain clock signal 404. The assertion of the synch pulse signal 426 assures that the information 418 is latched and provided at the output of the latch at the coincident edge of the two clock signals 422-424. In this manner, the interface between the domains acts as if it is paced by the slow clock signal 422, thus allowing the communication between the domains to be synchronous with the slow clock signal 422 of the slower domain. In addition, because the synch pulse signal 426 is configured to the coincident edges of the two clock signals, it does not matter which direction the communication occurs, whether from a slower domain to a faster domain or vice versa. Through the use of the circuit 400 of FIG. 4A and the synch pulses 426, the communication may occur synchronous with the slow clock signal 422 of the communicating domains.

In a similar manner, a synch pulse signal may also be utilized by a domain to create a virtual ratioed clock signal within a domain. In one embodiment, a virtual clock signal is utilized to pace a logic pipeline within a domain that is not required to operate on the faster domain clock signal. For example, some logic and/or transmission paths within a domain, such as access to Control and Status Registers (CSRs), may not require a high frequency or high performance signal on the read path. In other words, the read path for the CSRs may occur at a lower frequency than the operating clock frequency of the domain without any detrimental effects to the performance of the processor or domain. Because high frequency paths in a processor design generally require more chip area and higher performance hardware components, it may be advantageous to create a low frequency access for the CSRs within a high frequency domain of the processor. To create a low frequency clock signal to pace the low frequency read path, a synch pulse as described above may be utilized to create a virtual clock signal within a domain for a low frequency pipeline.

Figure 5A:
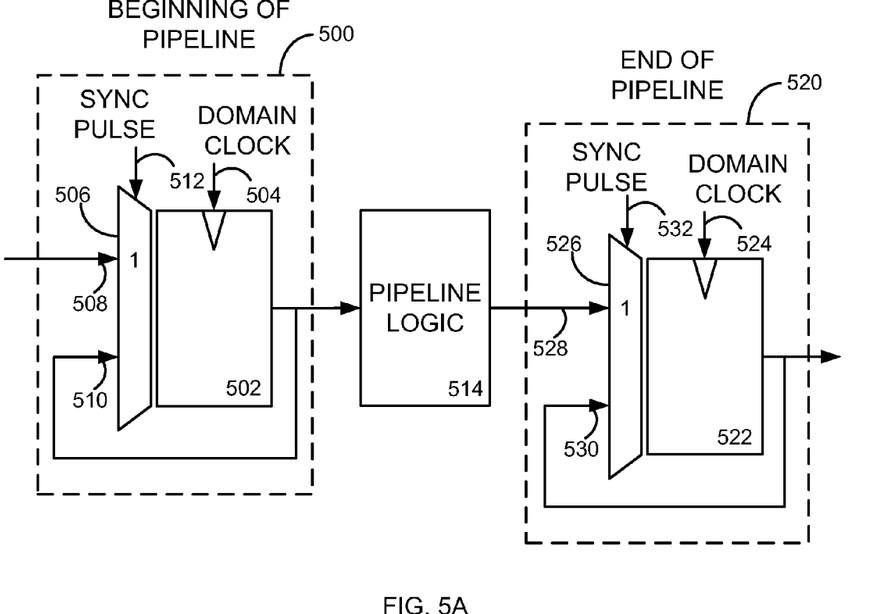
FIG. 5A is a circuit diagram illustrating a ratioed synchronous clock signal pipeline in a domain of a microprocessor.
Figure 5B:
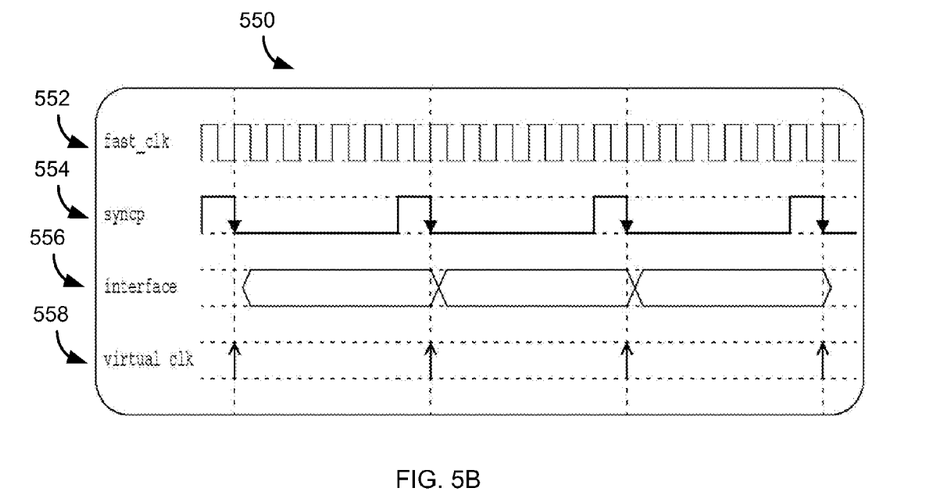
FIG. 5B is a timing diagram illustrating utilizing a synch pulse signal to create a ratioed virtual clock signal.

FIG. 5A is a circuit diagram illustrating a ratioed synchronous clock signal pipeline in a domain of a microprocessor and FIG. 5B is a timing diagram illustrating utilizing a synch pulse signal in the circuit of FIG. 5A to create a virtual clock signal within a domain of a microprocessor. Several of the features of the circuit of FIG. 5A and the timing diagram of FIG. 5B are similar to the same features in the circuit of FIG. 4A and the timing diagram of FIG. 4B such that the description of FIGS. 4A and 4B may be referred to herein to describe some of the aspects of FIGS. 5A and 5B.

To create the low frequency clock pipeline, the circuit described above with reference to FIG. 4A provides an interface between the rest of the domain and the low clock pipeline. In particular, as shown in FIG. 5A, an interface circuit 500 including a latch device 502 and a multiplexer 506 is electrically connected to the beginning of the pipeline. In general, the beginning interface circuit 500 is similar to the circuit of FIG. 4A. Thus, the latch device 502 is paced by the domain clock signal 504 and the input to the latch is selected by a multiplexer 506 by a synch pulse signal 512. The synch pulse signal 512 selects between the information 506 to be transmitted through the low frequency pipeline and the output of the latch through a feedback loop 510. Through the operation of the beginning interface circuit 500, the information 508 transmitted to the low frequency pipeline is transmitted to the pipeline in synch with the synch pulse signal 512.

The output of the beginning interface circuit 500 connects to an input of the low frequency pipeline logic 514. In general, the pipeline logic 514 may include any number of logic devices of the processor design that operates on a clock signal with a frequency lower than the domain clock signal frequency. For example, the pipeline logic 514 may be one or more Control and Status Registers that may be read at a low frequency. However, any type and number of logic devices or portions of the processor design may be included in the pipeline logic 514 such that the portions operate on a lower clock frequency than the domain clock signal. It should be appreciated that the portions of the processor domain that operate on the lower clock frequency may utilize less expensive components and less design space.

The circuit of FIG. 5A may also include an end interface circuit 520 that has a similar design as the beginning interface circuit 500. Thus, the end interface circuit 520 includes a latch device 522 that operates on the domain clock signal 524 and a multiplexer 526 that selects between the output 528 of the pipeline logic 514 and the output 530 of the latch device 522 through the feedback loop. The multiplexer 526 selects between the inputs based on the synch pulse signal 512 such that the output of the latch device 522 operates on the synch pulse signal, as shown in the timing diagram of FIG. 5B.

The timing diagram 550 of the circuit of FIG. 5A includes a fast clock signal 552. The fast clock signal 552 is representative of the domain clock signal 504, 524. In general, however, the portion of the domain included in the pipeline logic 514 may not need to operate at the frequency of the fast clock signal 552, but may operate at a slower frequency. To create this slow frequency pipeline, the synch pulse signal 554 is utilized by the multiplexers 506, 526 of the circuit. The synch pulse signal 554 of FIG. 5B is the same synch pulse signal discussed above with reference to FIGS. 4A and 4B. However, rather than facilitating communication between domains of the processor, the synch pulse 554 is used here to create the slow frequency pipeline clock signal. More particularly, in a similar manner as discussed above with reference to FIG. 4B, the synch pulse 554 is configured such that the de-assertion of the synch pulse creates a rising edge of a virtual clock 558. In relation to the circuit of FIG. 5A, both multiplexers 506, 526 select the information 508, 528 at the input to the multiplexer upon assertion of the synch pulse signal 512, 532, which is then latched and provided as an output of the latch devices 502, 522 on the next rising edge of the fast clock signal 552. The latching and outputting of the information is shown by the interface signal 556 of the timing diagram 550 of FIG. 5B. In essence, the synch pulse signal 524 creates a virtual clock signal 528 that paces the input and the output of the low frequency pipeline to be synchronous with the synch pulse signal. In this manner, the pipeline logic 514 may be constructed as a low frequency domain with the fast clock domain to save chip space and design cost. The interface signal 556 illustrates how the input and the output of the low frequency pipeline are synchronous with the virtual clock signal 558.

As discussed above, the synch pulses of the microprocessor may be utilized to facilitate communication between domains operating on different ratioed clock signal frequencies. Such ratioed clock signal frequencies and synch pulses may be created by the microprocessor utilizing one or more counters, as discussed above with reference to FIG. 3. In one embodiment, the counter used to create the one or more ratioed clock signals and synch pulses may be integrated into the clock control circuitry of the processor. However, in this embodiment, one or more of the ratioed clock signals may be high frequency such that high frequency signal lines and hardware components are used in the processor design to facilitate the high frequency ratioed clock signals. In another embodiment, though, the counters used to create the ratioed clock signals and synch pulses may be integrated into domain headers 214A-H such that the additional high frequency wires in the processor design need not be present between the clock control circuitry and the domains. Rather, the processor clock signal may be provided to each domain 212A-H and the ratioed clock signals and synch pulse signals may then be created as needed at the domain headers 214A-H. By locating the counters at the domain headers 214A-H, chip space and hardware costs may be saved as fewer high frequency signal paths are needed for the processor design.

To ensure that all of the counters in the processor design are synchronized (and as a result the ratioed clock signals and synch pulses generated at the domain headers 214A-H are synchronized), a reset signal may be provided within the processor to all of the counter devices such that all of the counters are reset at the same time. Typically, the reset signal is provided to each domain header 214A-H on a high frequency wire because the reset operates at the same frequency as the processor clock signal. However, the reset signal is rarely used in the life of the processor and the high frequency wire used to carry the reset signal may include large chip space and costly hardware components. Thus, in one embodiment, the reset signal is transmitted through the processor to the counters of the domain headers 214A-H as a low frequency signal. As explained in more detail below, to ensure that all of the counters synchronize with the processor clock signal, the processor clock signal is stopped until the reset signal has been transmitted to the counters so that each counter can be synchronized with the processor clock signal.

Figure 6A:
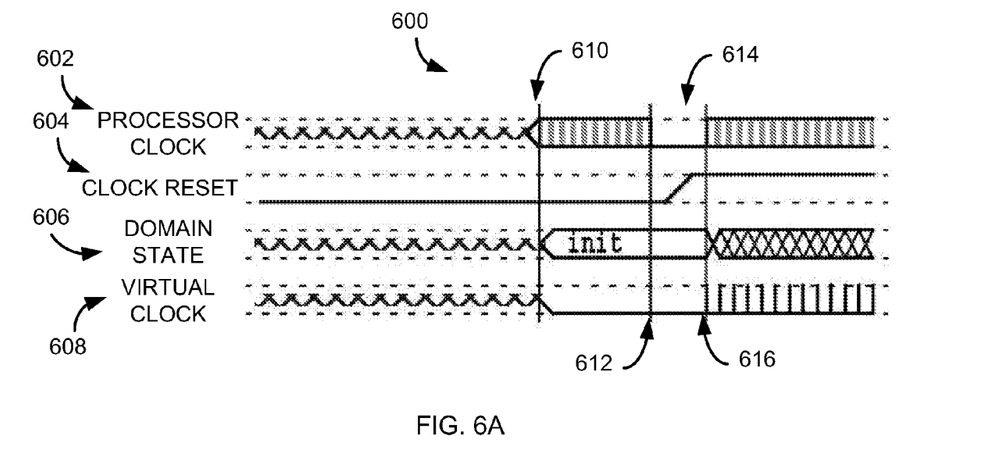
FIG. 6A is a timing diagram illustrating a low frequency reset signal to synchronize one or more counters of a microprocessor design to a processor clock.

FIG. 6A is a timing diagram illustrating a low frequency reset signal to synchronous one or more counters of a microprocessor design to a processor clock. In particular, the timing diagram 600 includes the processor clock signal 602, a low frequency clock reset signal 604, an exemplary domain state signal 606 to illustrate the operation of the domain and an exemplary virtual clock signal 608 as discussed above. Further, the timing diagram 600 illustrates the start up of the processor. Thus, during the time represented by the left side of the timing diagram, the processor is not functioning, or turned off. However, beginning at time 610, the processor begins operating.

Upon start-up, the processor clock signal 602 begins operating. In addition, the domains may enter an initialization state represented in the domain state signal 606 as "init". Also, because the domain is still in the initialization phase, counters of the domain headers are not active such that the virtual clock signal 608 has not started. Also, during this time the reset signal 604 is asserted such that the counters are held at a zero value. In the embodiment shown, a low value on the reset signal 604 means that the reset signal is asserted, or the counters are being reset. In other embodiments, a high value on the reset signal resets the counters of the processor.

At some later point, such as at time 612, the synchronizing of the counters of the domain headers may begin. In one embodiment, the reset of the counters may occur at a high frequency such that the reset signal is transmitted on a high frequency wire. However, in the embodiment illustrated in FIG. 6A, the reset signal 604 may be a low frequency signal. For purposes of this disclosure, a low frequency signal is a signal that transitions from asserted to de-asserted (or vice versa) over more than one cycle of the processor clock signal 602.

Although the reset signal 604 is a low frequency signal, the counters of the domain headers may still be synchronized with the processor clock signal 602. In particular, in the embodiment shown in FIG. 6A, the processor clock signal 602 is stopped during de-assertion of the reset signal 604 to allow the change in the reset signal to propagate to each of the counters. As shown, during time period 614, the processor clock signal is stopped while the reset signal 604 is de-asserted, or transitions to a high value in the embodiment shown. Referring to FIG. 2, the processor clock signal may be stopped during this time period by the CMX 210. More particularly, logic electrically connected to the select input to the CMX 210 may be programmed or otherwise configured to provide a "no output" value on the select input of the CMX such that no clock signal is provided by the CMX during the time period 614. Also during the time period 614, the clock reset control unit 270 may de-assert the clock reset signal that is transmitted to the domain headers 214A-H. In this manner, the counters associated with the domain headers 214A-H may be reset to begin counting on the next clock cycle of the processor clock signal.

At some later time, such as time 616, the processor clock signal 602 begins again. Importantly, each of the counters receiving the reset signal 604 also begin counting at the same time that the processor clock signal begins. In this manner, the counters are synchronized with the processor clock signal 602. This is shown in the synchronized virtual clock signal 608 of the timing diagram 600. Also, once all of the counters have been synchronized with the processor clock signal 602, the domains may begin processing information and changing states, as shown by the domain state signal 606. Importantly, the counters of the domain headers are synchronized with the processor clock signal 602 even though the reset signal 604 is a low frequency signal. This occurs through the creation of a long clock cycle of the processor clock signal 602 by turning off the clock for some duration to allow the low frequency reset signal to reach the counters.

Figure 6B:
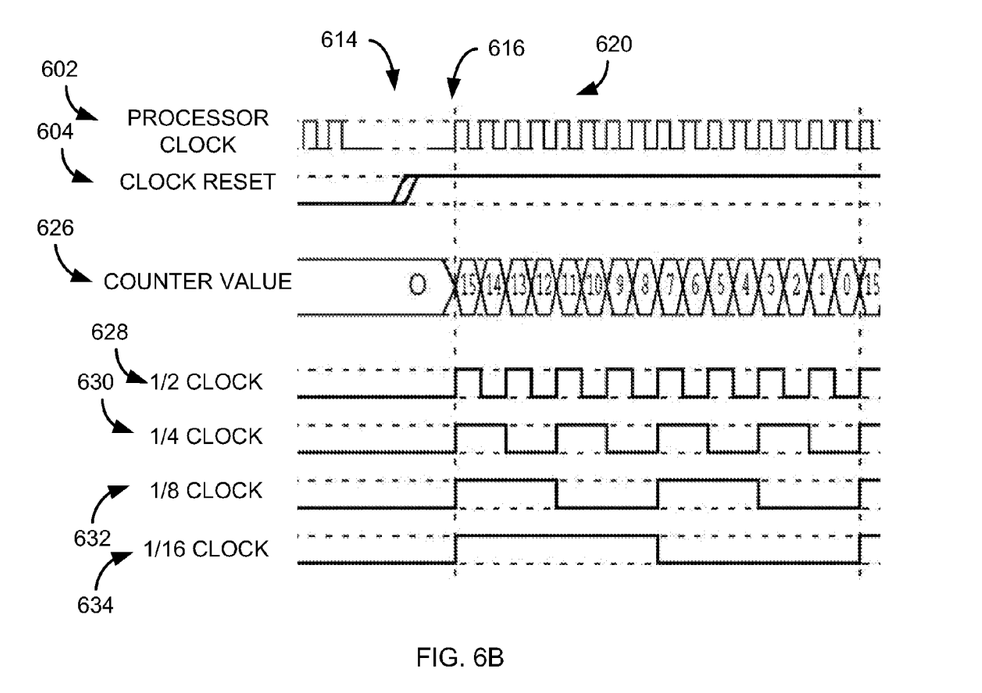
FIG. 6B is a timing diagram illustrating the resetting of a counter signal in a microprocessor utilizing a low frequency reset signal.

The synchronization of the various clock signals generated by the counters is illustrated in FIG. 6B. The timing diagram 620 of FIG. 6B includes the processor clock signal 622 the low frequency clock signal 604 of the timing diagram of FIG. 6A. As described above, the processor clock signal 602 is halted for a time period 614, during which the clock reset signal 604 is de-asserted. In addition, and similar to the timing diagram of FIG. 3, the timing diagram 620 of FIG. 6B includes a counter value signal 626 that shows the output value of a representative counter in the processor and a variety of ratioed clock signals of the processor clock signal 602. More particularly, a one-half clock signal 628, a one-quarter clock signal 630, a one-eighth clock signal 632 and a one-sixteenth clock signal 634 are included in the timing diagram 620.

As illustrated in the timing diagram 620, the assertion of the clock reset signal 604 maintains the counter value signal 626 at a zero value. To start the counters to begin counting down from fifteen, the clock reset signal 604 is de-asserted and the processor clock signal 602 begins again. This occurs at time 616 of the timing diagram 620. Thus, as shown, the counter value signal 626 outputs a value of fifteen and decrements at each cycle of the processor clock signal 602. Also, because the embodiment of the processor stops the processor clock signal 602 during time 614 to allow the de-assertion of the reset signal 604 to propagate to the counter, each counter of the processor is synchronized to the processor clock signal. In other words, each counter of the processor that is reset by the reset signal 604 begins decrementing at the same time and is synchronized with the processor clock signal 602, as represented by the counter value signal 626.

Further, because the counter value signal 626 is synchronized to the processor clock signal 602 and the ratioed clock signals 628-634 are generated by the counters, the ratioed clock signals are also synchronized to the processor clock signal. In this manner, each counter of the processor that are utilized by the domain headers to create the one or more ratioed clock signals are synchronized to the processor clock signal 602, each ratioed clock signal is also synchronized to the processor clock signal. This relieves the need for the ratioed clock signals to be generated by the processor clock circuitry, resulting in fewer high frequency signal wires in the processor design. Also, by halting the processor system clock signal 602 to de-assert the reset signal 604, the reset signal may also be low frequency, removing the need for a high frequency path for the reset signal. These costs savings, in chip space and hardware components, may result in a simpler and less costly processor design.

Figure 7:
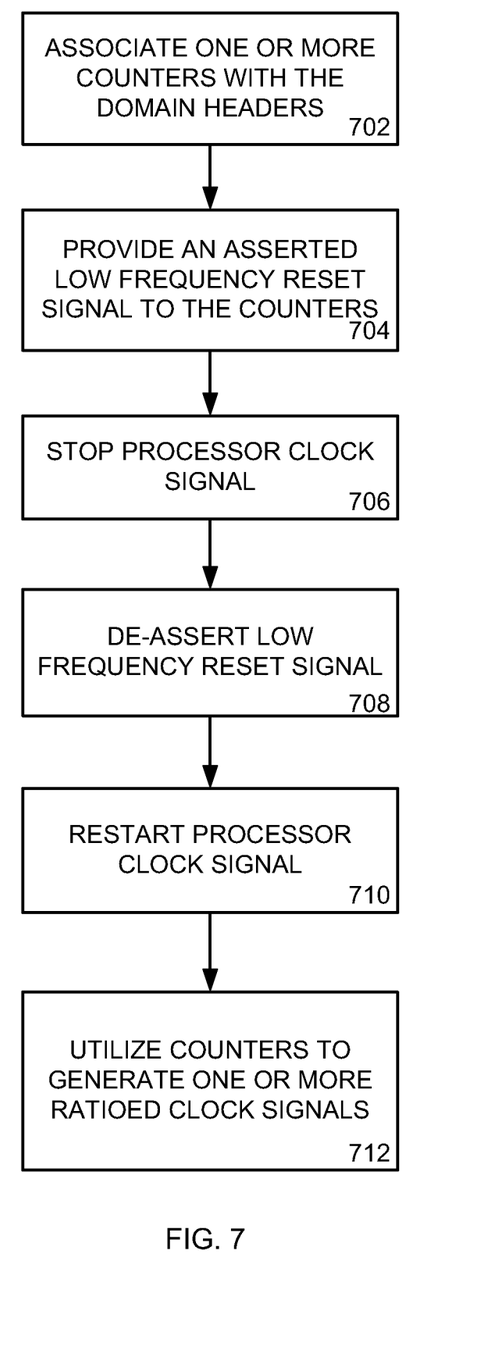
FIG. 7 is a flowchart of a method for utilizing a low frequency reset signal in a microprocessor design to synchronize various clock signals of different frequencies.

FIG. 7 is a flowchart of a method for utilizing a low frequency reset signal in a microprocessor design to synchronize various clock signals of different frequencies. The operations of the method of FIG. 7 may be performed by a processor of a computer system. In one embodiment, the processor may execute one or more instructions to perform one or more of the operations of the method of FIG. 7. In another embodiment, the processor may include one or more hardware components to perform the operations of FIG. 7. In still another embodiment, the operations may be performed by the processor through a combination of software and hardware.

Beginning in operation 702, the processor associates one or more counters with the domain headers of the processor design. Such association may occur during the design of the processor such that the counters are integrated into the domain header circuitry. As explained above, the counters may be utilized by the processor to create one or more ratioed clock signals within the domain of which the counter is associated.

In operation 704, the processor may provide an asserted low frequency reset signal to the counters of operation 702. The asserted low frequency reset signal holds the counters at a zero value while the processor clock signal operates. To begin to synchronize the counters to the processor clock signal, the processor clock signal is stopped in operation 706. While the processor clock signal is stopped, the low frequency reset signal is de-asserted in operation 708 such that the counters begin counting on the next processor clock cycle.

In operation 710, the processor clock signal is restarted, which also starts the operation of the counters. Thus, in operation 712, the processor utilizes the counters to generate one or more ratioed clock signals that are synchronized to the processor clock signal. These ratioed clock signals are generated by the domain header circuitry such that these clock signals are not centrally generated and provided to each domain, providing a design and hardware savings in the processor design.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A microprocessor comprising: a processor clock generating circuit configured to generate a processor clock signal, the processor clock generating circuit comprising a plurality of clock signal generating circuits each configured to provide a repeating clock signal and a clock multiplexer configured to output one of the plurality of repeating clock signals based on a first value on a clock selection input; and a plurality of logic domains, wherein each of the plurality of logic domains comprises a header portion comprising at least one counter configured to generate an output value signal that increments or decrements on each cycle of the processor clock signal;

wherein each header portion is configured to generate a plurality of clock signals from the output signal of the at least one counter of each header portion, the plurality of clock signals being synchronized and ratioed to the processor clock signal; and a reset control unit configured to provide a reset signal to the at least one counter of each of the plurality of logic domains, the reset signal configured to reset the output value signal of the at least one counter of each of the plurality of logic domains to a beginning value when the reset signal is asserted;

wherein the reset signal is transmitted to the at least one counter of each of the plurality of logic domains at a lower frequency than the frequency of the processor clock signal;

wherein each header portion is further configured to generate one or more synchronization pulse signals configured to enable communication between portions of the microprocessor, the synchronization pulse signals being synchronized to the processor clock signal.

2. The microprocessor of claim 1 wherein the clock multiplexer is further configured to output no clock signal based on a second value on the clock selection input, the second value different than the first value.

3. The microprocessor of claim 2 wherein the clock multiplexer is further configured to output no clock signal for a predetermined time period, the reset control unit is configured to assert the reset signal during the predetermined time period.

4. The microprocessor of claim 1 further comprising:
a logic domain communication interface circuit comprising:
   a multiplexer device comprising a plurality of data inputs, a selection input and an output, the multiplexer device configured to output one of the plurality of data inputs based on a value on a selection input; and
   a latch device comprising an input and an output;
   wherein the output of the multiplexer device is electrically connected to the input of the latch device and the output of the latch is electrically connected to a first data input of the plurality of data inputs.

5. The microprocessor of claim 4 wherein the one or more synchronization pulse signals generated by one of the plurality of logic domains is transmitted to the selection input of the multiplexer device of the logic'domain communication interface circuit such that an assertion of the one or more synchronization pulse signals causes the multiplexer to output data transmitted on a second input of the plurality of data inputs on the multiplexer device.

6. The microprocessor of claim 1 further comprising:
a low frequency logic pipeline comprising:
   a beginning pipeline interface circuit comprising:
      a first multiplexer device comprising a plurality of data inputs, a selection input and an output, the first multiplexer device configured to output one of the plurality of data inputs based on a value on a selection input; and
      a first latch device comprising an input and an output;
      wherein the output of the first multiplexer device is electrically connected to the input of the first latch device and the output of the first latch is electrically connected to a first data input of the plurality of data inputs of the first multiplexer device;
   at least one low frequency logic device comprising an input and an output, the input of the at least one low frequency logic device electrically connected to the output of the first latch device; and
   an ending pipeline interface circuit comprising:
      a second multiplexer device comprising a plurality of data inputs, a selection input and an output, the second multiplexer device configured to output one of the plurality of data inputs based on a value on a selection input; and
      a second latch device comprising an input and an output;
      wherein the output of the second multiplexer device is electrically connected to the input of the second latch device, the output of the second latch is electrically connected to a first data input of the plurality of data inputs of the second multiplexer device and the output of the at least one low frequency logic device is electrically connected to a second data input of the plurality of data inputs of the second multiplexer device.

7. The microprocessor of claim 6 wherein the one or more synchronization pulse signals generated by one of the plurality of logic domains is transmitted to the selection input of the first multiplexer device and the second multiplexer device of the low frequency logic pipeline.

8. The microprocessor of claim 7 wherein the synchronization pulse signals are a multi-cycle signal with a lower frequency than the processor clock signal.

9. A method for generating a plurality of synchronized clock signals in a microprocessor, the method comprising:
   suspending a processor clock signal configured to pace the operation of a plurality of counters associated with the microprocessor, wherein each of the plurality of counters is configured to generate an output value signal that increments or decrements on each cycle of the processor clock signal;
   asserting a reset signal while the processor clock signal is suspended;
   wherein the reset signal is transmitted to the plurality of counters at a lower frequency than the frequency of the processor clock signal;
   transmitting the asserted reset signal to the plurality of counters, the plurality of counters configured to reset the output value signal of each of the plurality of counters to a beginning value when receiving an asserted reset signal;
   restarting the processor clock signal;
   generating a plurality of clock signals from the output signal of the plurality of counters, wherein the plurality of clock signals are synchronized and ratioed to the processor clock signal;
   generating one or more multi-cycle synchronization pulse signals from the output signal of the plurality of counters, wherein the one or more multi-cycle synchronization pulse signals are configured to enable communication between portions of the microprocessor, the synchronization pulse signals being synchronized to the processor clock signal; and
   transmitting the one or more multi-cycle synchronization pulse signals to an entering low frequency logic pipeline interface circuit and an exiting low frequency logic pipeline interface circuit to create a logic block that operates on the one or more multi-cycle synchronization pulse signals.

10. The method of claim 9 wherein the suspending the processor clock signal comprises:
   generating a value at a selection input to a clock multiplexer, the clock multiplexer configured to output no clock signal based on a value on a clock selection input.

11. The method of claim 9 wherein the one or more multi-cycle synchronization pulse signals are a lower frequency than the processor clock signal.

12. A computer system comprising:

an input unit; and a multi-core processor coupled to the input unit, the processor comprising:

a processor clock generating circuit configured to generate a processor clock signal, the processor clock generating circuit comprising a plurality of clock signal generating circuits each configured to provide a repeating clock signal and a clock multiplexer configured to output one of the plurality of repeating clock signals based on a first value on a clock selection input;

a plurality of logic domains; and a plurality of interface circuits each associated with at least one of the plurality of logic domains, wherein each interface circuit comprises at least one counter configured to generate an output value signal that increments or decrements on each cycle of the processor clock signal;

wherein each interface circuit is configured to generate a plurality of clock signals from the output signal of the at least one counter of each interface circuit, the plurality of clock signals being synchronized and ratioed to the processor clock signal; and wherein each interface circuit is further configured to generate one or more synchronization pulse signals configured to enable communication between the plurality of logic domains of the processor, the synchronization pulse signals being synchronized to the processor clock signal; and     a reset control unit configured to provide a reset signal to the at least one counter of each of the plurality of logic domains, the reset signal configured to reset the output value signal of the at least one counter of each of the plurality of logic domains to a beginning value when the reset signal is asserted;

wherein the reset signal and the synchronization pulse signals are transmitted at a lower frequency than the processor clock signal.

\* \* \* \* \*